Patented Aug. 25, 1936

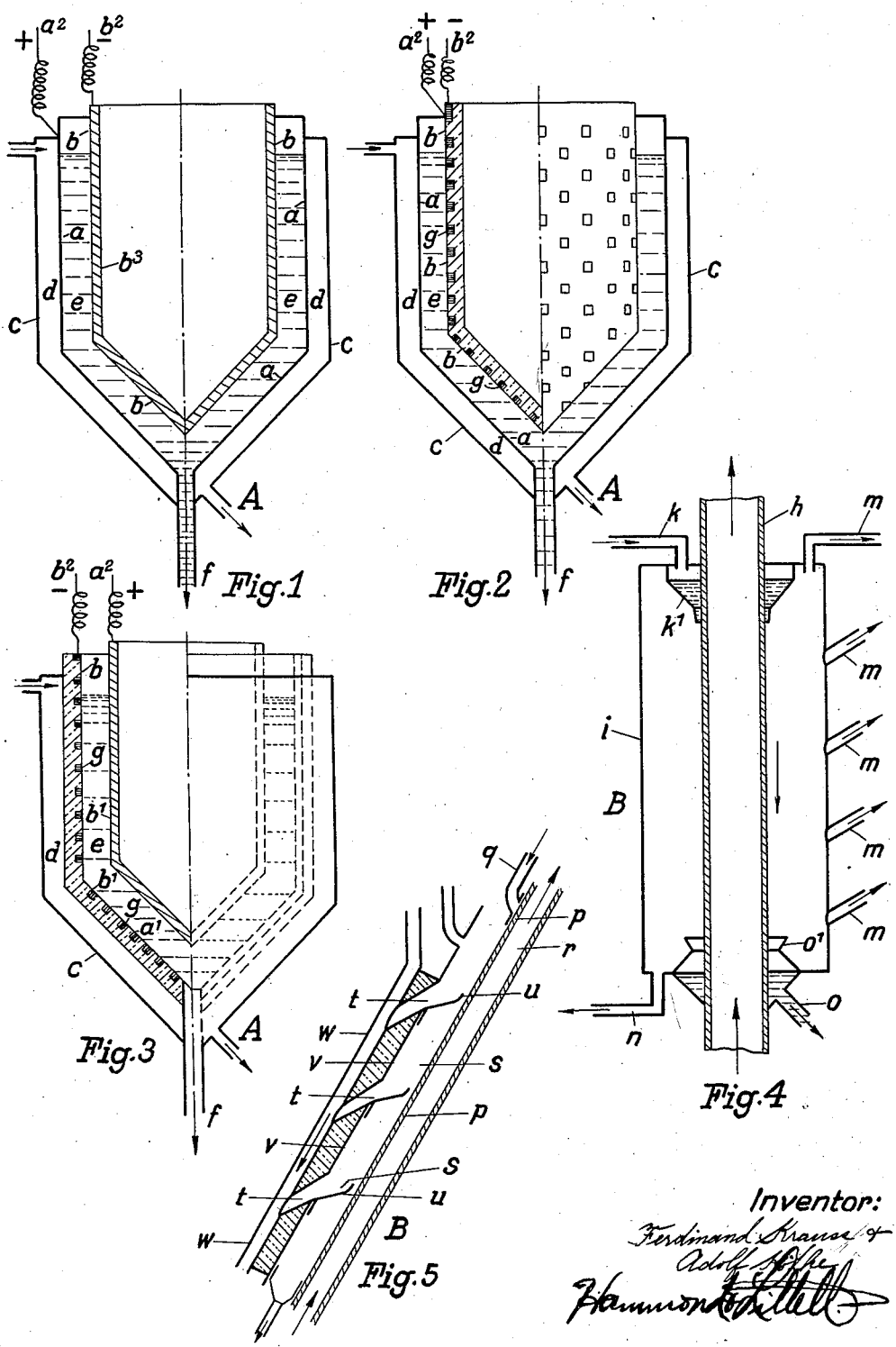

2,051,951

UNITED STATES PATENT OFFICE 2,051,951

PROCESS AND APPARATUS FOR PRODUCING HYDROGEN PEROXIDE

Ferdinand Krauss, Brunswick, and
Adolf Köpke, Leipzig, Germany

Application May 31, 1934, Serial No. 728,292
In Germany March 3, 1929

2 Claims. (Cl. 204—9)

This invention relates to a process and apparatus for the production of hydrogen peroxide, more especially to the continuous production of hydrogen peroxide by a combination of electrolysis and distillation, the electroylte being prepared once for all so that no additions are required during all the following operations.

In carrying out the invention, an aqueous solution of sulphuric acid and ammonium bisulphate is subjected to electrolysis resulting in the production of a solution containing ammonium persulphate besides free acid and the latter solution is subjected to distillation, preferably under vacuum. During the distillation the ammonium persulphate reacts with the water to produce hydrogen peroxide which is separated out of the solution by distillation.

According to the invention the electrolysis is carried out in an electrolyzer in which the electrodes are not separated by a porous diaphragm and the electrolyte consisting of an acid solution of ammonium bisulphate is kept flowing. The electrolysis however is not carried to the point where all of the ammonium bisulphate is wholly converted to ammonium persulphate or salts are precipitated. The solution subjected to electrolysis is acidified with sulphuric acid as to produce a specific gravity of at least 1.2. The process is a continuous one and requires no further addition of sulphuric acid during its operation.

In carrying out the continuous process the acid persulphate solution obtained by electrolysis is fed continuously and streams through the distilling apparatus without, as already mentioned, any further addition of sulphuric acid. The electrolyzer and the distilling apparatus may be separated from each other, or they may be combined in which case the whole of the process may be carried out automatically. In the distilling apparatus, the persulphate is reconverted into bisulphate by heat under partial consumption of the water contained in the solution, hydrogen peroxide being simultaneously formed so that the resulting solution will have the same bisulphate and sulphuric acid content as the solution before electrolysis. The solution is withdrawn from the distilling apparatus in a continuous flow and, after the addition thereto of the lost water, fed again into the electrolytic cell. The hydrogen peroxide is continuously distilled off and the condensate is also withdrawn from the apparatus in a continuous stream.

The difficulty with accomplishing such distillation is that it is necessary to work with thin layers in order to obtain a satisfactory yield.

In hitherto known distilling apparatus, the solution used flows in a thin sheet on the inner walls of externally heated pipes. This has the disadvantage that the escaping vapors come into contact with the downwardly flowing solution. According to the present invention the distillation is carried out preferably under vacuum with thin layers and with profitable yield, the disadvantages of the old processes being eliminated. The pipes of the present apparatus are heated from the inside, and the solution flows along the outside of the pipes. In this manner the driven off vapors can easily be withdrawn from the distillation zone and prevented from coming into further contact with the flowing solution. The outer surfaces of the outer jackets of the apparatus may be heated in order to maintain a uniform temperature in the interior of the apparatus.

As a modification the outer walls may be cooled, the effect of which will be that the solution to be distilled only comes into contact at one side with a heated surface and that the vapors escaping from the other side enter a space having a much lower temperature so that they are immediately removed under rapid condensation.

A suitable apparatus for carrying out the invention may be constructed in such a manner that the solution is made to flow in thin layers along the outer surface of vertical or inclined, internally heated pipes or the like. The heating can be effected in any suitable manner, for instance, by means of steam, electric current or the like. The pipes may be encircled by an outer jacket which is cooled and from which the rapidly condensing vapors given off by the thin layer of the solution, can be readily removed from the distillation zone.

The accompanying drawing wherein like characters denote corresponding parts in the several views, shows the essential parts of a plant for carrying out the invention. Other parts such as circulation and vacuum pumps, connecting pipes, heating elements, cooling devices, sources of electric current, etc. are not illustrated as being common in the art.

Figure 1 is a vertical section through that part of the apparatus in which electrolysis is effected.

Figure 2 is a view partly in elevation and partly in section disclosing a modified form of the apparatus.

Figure 3 is a view similar to Figure 2 showing a further modification of the electrolytic apparatus.

Figure 4 is a vertical section disclosing one form of the apparatus in which the product of electrolysis is subjected to distillation.

Figure 5 is a view similar to Figure 4 showing a modification of the distillation apparatus.

In the apparatus for carrying out the present invention, there is provided an electrolytic cell A and a distilling apparatus B.

In the construction of the electrolytic cell A in Figure 1, there is provided an inner cylindrical casing $b$ having an inverted conical bottom $b^1$. Spaced uniformly from this inner casing is an outer casing consisting of a cylindrical body $a$ having a conical bottom $a^1$ from the apex of which extends a drain pipe $f$. These casings are suitably supported by an insulation (not shown) so that each is insulated from the other and from all extraneous parts of the apparatus and are connected by conductors $a^2$ and $b^2$ to a suitable source of electric current so that they may form the electrodes of the electrolytic cell. A pump is connected to the space $e$ between the anode and cathode by pipe $f$ and, as will be presently understood, a continuous flow of electrolytic solution is maintained by the pump through this space. Within the inner casing $b$ is a jacket or jacket casing $b^3$ which is spaced from the inner casing or electrode and through the space formed thereby a cooling medium may be circulated. Similarly there is a jacket $c$ spaced outside the outer electrode and a cooling fluid may also be circulated through the space $d$ thus provided.

To increase the cathodic or anodic density of current the electrodes may be formed, as shown in Figures 2 and 3, of a non-conducting body or hollow body provided with numerous holes which are suitably filled with a conductor such as lead. The non-conducting body may consist of an inert material such as quartz, glass, porcelain or the like. The holes may have the form of circles, squares or other shapes the distance of which from one another and from the cathode or anode respectively is made nearly equal.

As already mentioned the electrolysis is effected without precipitating any salt and only up to a point where the current output begins to unduly decrease. A satisfactory working of the electrolysis is easily obtained by regulating the rate of flow of the electrolyte passing the cell.

The output can be increased by reducing the free space between the electrodes. For instance, it has been proved advantageous to introduce suitably shaped bodies of inert material such as glass into the flowing electrolyte.

It may be noted that the apparatus and therewith the anode may have another form than that of a funnel and that if desired only a part of the surface may be covered with a conductor, for instance platinum to form the anode.

The condenser B shown in Figure 4 comprises a heating tube $h$ through which a current of hot fluid is maintained from any suitable source of supply (not shown). Surrounding this tube is a closed casing or jacket $i$ and depending from the upper end of this casing is a funnel $k^1$ having its lower end concentric to and slightly spaced from the tube $h$ so that a narrow annular space is provided between the lower end of the funnel $k^1$ and said tube. By this means, liquid flowing downwardly from the funnel $k^1$ forms a thin sheet surrounding the hot tube so that distillation of the volatile constituents of such liquid is readily obtained. The pipe $k$ leads from the electrolytic cell to the upper part of the funnel $k^1$. At the lower end of the casing there is provided a funnel $o^1$ which surrounds the tube $h$ so that the residue from the distillation flowing down said tube will readily find its way into the funnel. A pipe $o$ leads from the lower part of the funnel $o^1$ to a circulating pump on its suction side. It will now be readily understood that a continuous circulation of fluid is maintained through the electrolytic and distilling sections of the apparatus.

The vapors may be withdrawn by pipes $m$ provided at spaced points in the wall $i$ and connected with a vacuum pump, or the casing $i$ may be suitably cooled and the condensate withdrawn by pipe $n$.

It is preferable to introduce into the utilizable part of the evacuated space filling bodies as, for instance, the so called Raschig rings, to multiply the active surface of the distilling apparatus.

In Figure 5 $p$ is an inclined distilling face along which the liquid to be distilled which is introduced at $q$ runs down in a thin layer. This distilling face is, for instance, heated by steam flowing through the space $r$ in the direction of the arrows. The vapors developed out of the thin layer flowing down enter the chambers $s$ from which they are wholly or partly removed by pipes $t$, the condensing part, if any, flowing down the guiding faces $u$ and the cooled wall $v$ and being likewise at once removed by the collecting pipe $w$ from the distillation zone.

The plant may be operated without peculiar difficulties automatically. For this purpose, for instance, the bisulphate solution leaving the evacuated decomposing and distillation apparatus as well as the hydrogen peroxide flowing off may be separately conducted by means of two- or three-way-cocks or the like into one or more collecting receivers. Other containers likewise connected with the said cocks are discharged under atmospheric pressure, the cocks being automatically reversed as soon as the containers are full so that the full containers are discharged under atmospheric pressure, whereas the containers previously discharged are filled again.

The following is an example of the process:

For the production of hydrogen peroxide, a quantity of 920 g. sulphuric acid was added to a solution of 290 g. ammonium bisulphate in 500 ccm. of water. After subjection to electrolysis, the liquid contained about 230 g. ammonium persulphate and about 58 g. ammonium bisulphate. This was fed in a thin layer into the apparatus according to the invention and heated therein; and the hydrogen peroxide formed by the action of the sulphuric acid on the persulphate was distilled off.

Theoretically it should be possible to obtain from a solution of 230 g. ammonium persulphate about 140.3 g. of a 30% hydrogen peroxide solution. Actually 109.86 g. were obtained in the above described distillation plant so that the yield of hydrogen peroxide was over 96%.

No separation of salts took place during the process and no addition of sulphuric acid during the process was required.

The solution discharged from the distilling apparatus had the original sulphuric acid content, namely, 920 g. and also the original content of ammonium bisulphate, namely, 290 g.

The above described apparatus will, as compared with known apparatus, bring about the following advantages:

1. The distance between the cathode and the anode is uniform, and nearly the same current density is obtained at all points.

2. The entire electrolyte will be transversed by the current, and no dead spaces through which little or no current flows, will occur, as do in a common electrolytic bath.

3. Owing to the absence of dead spaces there will be no decomposition of formed products, whereby the output will be increased.

4. Since the electrodes themselves form the walls of the cell, and no special containers of glass, quartz, clay, earthen ware or the like are needed, a considerable saving of material will result.

5. By using the anode and cathode walls as heat exchangers, a more intensified cooling will be obtained than by the ordinary cooling coils of glass or the like, since on the one hand the surface area is greater and since the heat conductivity of the metal is greater.

6. A further important advantage is the feature that no separation of salts takes place either during the electrolysis or during the distillation for which reason the electrolysis as well as the distillation can proceed without interruption.

All these advantages lead to a much greater current output than that obtained by the usual processes.

The apparatus shown in Figure 4, moreover, allows the use of a heating medium which is under pressure in spite of the comparatively thin wall of the inner pipe. This advantage is particularly pronounced when the distillation space is under vacuum, since the thickness of the wall can be much thinner when the pressure is inside and the vacuum outside the pipe instead of vice versa. The thin wall promotes the heat exchange and thus saves the distillation heat.

We claim:—

1. The method of producing ammonium persulphate by electrolyzing ammonium bisulphate which comprises passing a solution of ammonium bisulphate and sulphuric acid having a specific gravity of at least 1.2 as an electrolyte between an anode presenting a continuous active surface and a cathode having a surface of substantially the same extent but consisting of relatively small conducting areas spaced throughout its surface and separated by non-conducting areas, said electrolyte passing in direct contact with both the anode and the cathode.

2. An electrolytic cell suitable for use in producing ammonium persulphate by electrolysis of ammonium bisulphate having cylindrical electrodes which nest relatively closely one within the other to provide an inter-electrode electrolyte-containing space through which the electrode flows and of which the active surfaces are uniformly spaced apart, the anode serving as the wall of the cell and the cathode having its active surface restricted over the entire area thereof and consisting of relatively small conducting areas and non-conducting areas separating said conducting areas.

FERDINAND KRAUSS.
ADOLF KÖPKE.